United States Patent Office 3,512,766
Patented May 19, 1970

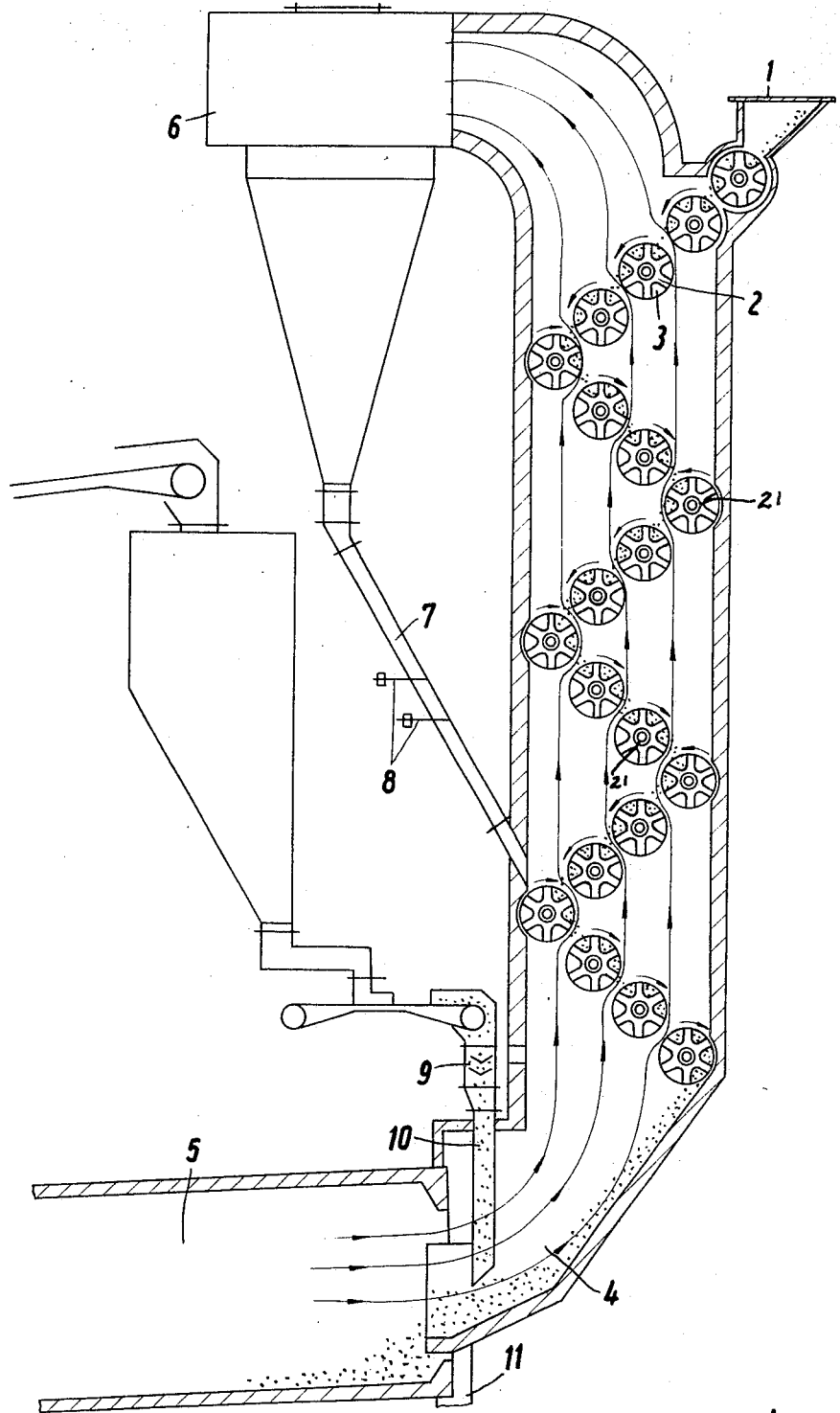

3,512,766
APPARATUS FOR PREHEATING SOLIDS
Johann Oberndorfer, Oberursel, Taunus, Germany, assignor, by direct and mesne assignments, of one-half to Metallgesellschaft Aktiengesellschaft, Frankfurt am Main, Germany, and one-half to The Steel Company of Canada Limited, Hamilton, Ontario, Canada, a corporation of Canada
Filed Mar. 30, 1967, Ser. No. 627,165
Claims priority, application Germany, Apr. 13, 1966, M 69,130
Int. Cl. F27b 21/02; F27d 3/12
U.S. Cl. 266—20                                12 Claims

ABSTRACT OF THE DISCLOSURE

An apparatus for preheating solids wherein the solids are introduced, in divided form, into an upper inlet of a hollow flue and are conveyed downwardly therein to a discharge outlet at the lower portion of the flue by a series of rotary feeder members which pass the solids from one feeder member to the succeeding one whereby the inflowing solids are preheated by hot gases flowing through the flue as they travel over an extended downward path therein established by the arrangement of the feeder members.

---

This invention relates to an apparatus for preheating solids, and more particularly to an apparatus for preheating solids by contact with hot gases as the solids are passed through a flue.

The apparatus of the instant invention is ideally suited for preheating solids which require a careful mechanical handling for one reason or another. Accordingly, the apparatus is ideally suitable for treating green pellets made from ores which contain iron.

According to a preferred embodiment of the invention, the solids are introduced, in divided form, into an upper inlet of a hollow flue and are conveyed downwardly therein to a discharge outlet at the lower portion of the flue by a series of rotary feeder members which pass the solids from one feeder member to the succeeding one for ultimate delivery by the last feeder member to the discharge outlet. These feeder members are so arranged as to allow hot gases to flow through the flue to preheat the inflowing solids as they travel over an extended downward path established by the arrangement of the feeder members. This downward path is preferably a zig-zag path and the hot gases are preferably introduced into the flue so that they flow countercurrent to the overall motion of the solids therethrough.

In general, equipment for preheating solids on gas-permeable conveyors in which the solids contact hot gases is known in the prior art as exemplified by German Pat. No. 902,594 and the printed German patent application No. 1,031,328. However, the type of equipment described by these German patents requires a relatively large space and relatively high capital cost.

Shaft-type preheaters having louvre-plate grates of the type shown in German Pat. No. 614,699, and shaft-type preheaters having zig-zag, stepped grates as shown in German Pat. No. 1,151,708 are also known. In the latter preheating apparatus, the stepped grates are moveably mounted on beams, which extend from the preheating shaft or flue. These grates are mounted in such a manner that the gas passages between the steps of the grates as well as the inclination of the steps can be varied.

These preheaters are not suitable, however, for treating solids which are mechanically delicate because they are so constructed that the solids tend to slip under the action of gravity over the plates and grates. Their efficiency is somewhat further limited by reason of the fact that in such prior art equipment the transferred heat is primarily effected by a convection of heat from the hot gases.

A preheating shaft furnace is known which has louvre-like annular grates (German printed patent application No. 1,031,328) and in which the solids fall freely so that such preheating furnace is not suitable for treating solids which require delicate mechanical handling.

The apparatus according to the invention avoids the disadvantages of the aforementioned prior art preheating equipment in that it provides an essentially vertical preheating flue shaft, which is provided at its lower end with gas inlets and a solids discharge outlet and at its upper end with gas outlets and a solids inlet, and which contains a zig-zag, stepped grate arrangement, which extends from one wall to the opposite wall of the flue, each step being a cylindrically extending rotary feeder member of star-shaped cross sectional configuration, and which is mounted on a shaft extending through the walls of the preheating flue shaft to accommodate the rotation of such individual feeder members relative to the flue shaft. Gas passage slots are provided between the star feeders forming the steps of the stepped grate.

Depending upon the operating conditions involved, more particularly the maximum temperatures to be encountered, these star-shaped feeders may be made of either a ceramic, metallic or any other heat resisting material.

If it should be desired to cool one or more of these star feeders, their shafts can be of hollow construction and provided at opposite ends with inlets and outlets for circulating a coolant therethrough. With such an arrangement, the feeders will be cooled by fluids, such as air or water passing through their respective shafts.

The star feeders can be expediently driven by means of a chain drive installed externally with respect to the flue and arranged to pass over sprockets mounted on the individual feeder shafts.

The star-shaped cross sections of these individual feeders define recessed pockets which in the operation of the invention serve for holding quantities of solids received and transferred from one feeder to the next. Each feeder shaft is so connected to the drive means that the trajectory of the solids which fall from a pocket of a higher feeder will always terminate in a pocket of the next lower feeder. In this way, the solids will always be transferred from one pocket to another and are thus carefully handled and cannot slip down over the star feeders or drop through the spacing slots between them.

The direction of rotation of the star feeders in each flight of the zig-zag shaped grate is opposite to the sense of rotation of the star feeders in the next following flight. Each flight begins with an uppermost star feeder, which is close to the wall of the preheating shaft. The drive means is preferably adjustable so as to impart a speed within the range 10–30 r.p.m., and in most cases preferably between 15 and 20 r.p.m., to the individual star feeders.

The flights of steps of the grate extend at an angle of between 40 and 60°, and preferably between 45 and 50° with respect to the horizontal.

The vertical spacing between the bottoms of two pockets between which solids are transferred from one star feeder to the next lower one in between 10 and 30 cm., preferably between 15 and 20 cm. In this way, the material will be carefully transferred from pocket to pocket but with a sufficient although limited free fall to assure good heat exchange contact with the hot gases flowing through the flue.

The means for driving the star feeders and the means for charging the solids at the top end of the preheating shaft are interconnected in an adjustable manner and are adjusted in such a manner that the pockets will be filled to approximately 20 to 30% of their capacity. This will assure a good heat transfer by radiation and by contact with the hot pocket walls, and also will prevent the missing of pockets by solids undergoing transfer from one feeder to the next.

When the apparatus according to the invention is used in one of its preferred applications to preheat green pellets made from ores containing iron, the discharge end of the apparatus is suitably connected directly to the charging end of a rotary kiln wherein the preheated pellets are reduced. Under such an arrangement, the hot gases from the rotary kiln are passed into the preheater flue for utilization as heating gases therein. These gases from the rotary kiln can be expediently afterburnt in the lower part of the preheating flue.

In a further mode of operation of the apparatus according to the invention, relatively fine-grained ore may be preheated in the apparatus and be subsequently charged into a rotary kiln, where the ore is directly reduced. The material discharge from the rotary kiln may then be magnetically separated and the high-iron concentrate may be pelletized and charged to the rotary kiln or to the transfer part between the preheating flue and the rotary kiln.

One or more cyclones are preferably used for a preliminary collection of dust from the gases exhausted from the preheater. Where these gases from the preheater are at a temperature above 400° C., such cyclones are preferably provided with a refractory lining. The dust collected by such cyclone collectors is recirculated through traps into the lower part of the preheater, and such additional dust as may be present can be collected in a conventional manner by electrostatic precipitators or multicyclone dust collectors.

The preheater apparatus afforded by the instant invention has numerous advantages. One of these advantages lies in the fact that the preheater apparatus enables heat transfer both by convection from hot gases and by contact with the hot star feeders without subjecting the solids to any substantial mechanical stress throughout the entire treatment process. Another advantage is to be found in the fact that the apparatus is relatively insensitive to waste gases which contain dust because any dust which may deposit on the star feeders will be stripped off by the action of their rotary movement and the rolling solids which they handle.

The apparatus can be fed with gases at high temperatures because the star feeders can be made from ceramics if such material choice should be necessary for heat resistance, and the feeder shafts can be cooled if necessary to avoid an excessive temperature rise.

Essentially, the invention provides a preheater apparatus capable of handling solids in divided form and having a relatively simple construction that is not inherently subject to disturbance during the course of operation thereby providing a lower capital cost as well as lesser maintenance expenses. The apparatus enables a much better utilization of waste gases from a kiln so that a rotary kiln can be arranged to feed the preheater apparatus with gas or hot coal dust even at the charging end without any serious loss of the volatile constituents which can be utilized by afterburning in the preheater.

It is therefore an object of the invention to provide a preheater apparatus which is capable of preheating solid materials in divided form.

Another object of the invention is to provide a preheater apparatus as aforesaid wherein the flow of materials therethrough during preheating is accomplished without imposing any substantial mechanical stress upon the materials.

A further object of the invention is to provide a preheater apparatus as aforesaid which can utilize waste gases from a kiln to accomplish preheating of the materials.

Still another and further object of the invention is to provide a preheater apparatus as aforesaid the operation of which is relatively uneffected by dust deposited from the heating gases.

Other and further objects and advantages of the invention will become apparent from the following detailed description and accompanying drawing which shows a schematic elevation view, partly in section, of a preheater apparatus according to a preferred embodiment of the invention.

Referring now to the drawing, the pellets or other materials to be treated are charged to the preheater flue at an inlet 1 located at the upper portion thereof and through a gastight trap (not shown). The materials introduced into the flue are conveyed therethrough by a series of rotary feeder members 2 having a star-shaped transverse cross section defining a plurality of pockets 3 in each feeder 2, these feeders 2 being slowly rotated so that the materials are transferred from one pocket 3 into one of the pockets 3 of the next lower feeder 2 in succession, until the materials arrive at a chute outlet 4 which communicates with the rotary kiln 5 to charge same with the preheated materials delivered by the last feeder of the series.

As the materials are being transferred to successive feeders 2, waste gases from the kiln 5 enter through the outlet defined by chute 4 and flow countercurrent through the preheater flue with respect to the materials transfer direction to preheat same.

The preheating gases from the kiln 5 can, if desired, be subjected to preliminary dust collection in a centrifugal separator 6, from which the collected dust is recycled into the preheating flue through an inlet pipe 7 provided with two flap valves 8.

Any solids, such as coal, which are not to be subjected to preheating, may be charged through a gas-tight trap 9 and inlet pipe 10 into the kiln 5. Any solids which may be recirculated between the preheating flue and the rotary kiln 5 are collected by a chute 11 and recycled by it into the kiln 5.

As can be appreciated by the artisan from the foregoing, the invention provides a preheater apparatus wherein the materials are preheated by a countercurrent hot gas flow as they travel downwardly from the inlet 1 to the discharge chute outlet 4.

Because the material travel is accomplished by successive transfers between the rotating star feeders 2, no significant free fall occurs which might damage or otherwise impair the physical properties of the materials with respect to the requirements of any subsequent treatments they are to undergo after leaving the preheater.

As can be readily noted from the drawing, the feeders 2 extend cylindrically lengthwise across the flue and are mounted on shafts 21 that extend through the walls of the flue, so that they can be driven by an external drive means (not shown) which therefore need not be subjected to the high temperature environment of the flue. The feeders 2 are also arranged in rows that extend across the flue, these rows of feeders 2 being inclined to the horizontal, with adjacent rows being aligned for intersection to define a zig-zag array of feeders 2 which rotate about parallel and approximately horizontal shafts 21.

To minimize the impact experienced by the materials in transit through the flue, the feeders 2 are arranged in a close-spaced consecutively descending relation to one another which will permit substantially unimpeded upward flow of the heating gases, but which will assure the transfer of materials from the pockets 3 of each feeder 2 to the pockets 3 of an adjacent lower feeder 2 without any extended material free fall as the feeders 2 are rotated. By reason of such feeder 2 spacing arrangement, interfeeder 2 transfer of materials occurs along trajectories that initiate in one pocket 3 of the upper feeder 2 and terminate in a pocket 3 of the lower feeder 2 of each pair of adjacent feeders 2. This type of transfer trajectory, of course, requires that the feeders 2 rotate at a speed within a limited range, so as not to shower the materials. A feeder 2 speed within the range of 10 to 30 r.p.m. will be satisfactory for most purposes, however the more limited range of 15 to 20 r.p.m. is a preferred range.

For practical purposes, the rows of feeders 2 are inclined to the horizontal at an angle within the range 40° to 60°, and preferably within the range 45° to 50°. Similarly, it has been found that a feeder 2 spacing which provides a vertical spacing between the bottoms of the pockets 3 of the upper and lower feeders 2 of each pair thereof, within the range of 15 to 20 cm. will be satisfactory.

The preheater of the invention is ideally suited to continuous material flow preheating operation, and for such purpose, any conventional material infeed means (not shown) can be employed to continuously deliver the materials through inlet 1 to the first feeder 2 in the series. Such infeed means can be expediently coupled to the feeder drive shafts 21 to achieve an interfeeder 2 material transfer rate corresponding to the delivery rate of the infeed means. For optimum performance, the infeed means delivery rate and the interfeeder 2 transfer rate is set, as by an adjustable coupling means (not shown), to effect a feeder 2 pocket 3 filling of 20 to 30% capacity.

The diameter of the star feeders is in the range between 0.3 m.–1.0 m.

If, by reason of the temperatures within the flue, it should be necessary to cool the drive shafts 21 of the feeders 2, such drive shafts 21 may be of hollow construction so as to accommodate the flow therethrough of coolants, either liquid or gas. For high temperature protection, the feeders 2 can be made of a ceramic material, or in fact of any suitable heat-resisting material.

While for purposes of example and simplification, the feeders 2 have been illustrated as having a star-shaped transverse cross section which provides each feeder 2 with six radially arranged pockets 3, the number and geometry of the feeder pockets 3 can be varied to suit the needs of any particular application.

Likewise, other modifications and variations of the basic preheater apparatus shown and described herein can be made by the artisan without departing from the scope of the invention. However, the invention is intended to be limited only by the following claims in which I have endeavored to claim all inherent novelty.

What is claimed is:

1. An apparatus for preheating solid materials in divided form which comprises a hollow flue having an inlet disposed at the upper part of the flue for receiving divided materials to be preheated and an outlet disposed at the lower part of the flue for discharging preheated materials, a rotary kiln disposed for communication with the materials discharge outlet of said flue to receive preheated materials therefrom and to deliver to said flue hot gases for preheating materials passing through said flue, a plurality of feed members disposed within said flue and for rotation relative thereto, said feed members being arranged in a plurality of rows extending across the width of said flue, each row of feeder members being inclined at an angle with respect to the horizontal to define a zig-zag array of feeder members, said feeder members each have a plurality of recessed pockets for holding quantities of materials received and transferred thereby and said feeder members are arranged in spaced relation to one another to allow a gas flow between the feeder members and to transfer said materials along trajectories that initiate in one pocket of the upper feeder member and terminate in a pocket of the lower feeder member of each pair of adjacent feeder members over a limited feeder member rotation rate range without extended free fall through the flue during rotation of said feeder members, each of said feeder members having drive shafts extending through the wall of said flue for connection to an external drive means to rotate said feed members, said drive shafts are approximately horizontal and parallel to one another.

2. The apparatus according to claim 1 wherein said feeder member limited rotation rate range is 10 to 30 r.p.m.

3. The apparatus according to claim 1 wherein said feeder member limited rotation rate range is 15–20 r.p.m.

4. The apparatus according to claim 1 wherein said rows of feeder members are inclined to the horizontal at an angle within the range 40° to 60°.

5. The apparatus according to claim 1 wherein said rows of feeder members are inclined to the horizontal at an angle within the range 45° to 50°.

6. The apparatus according to claim 1 wherein the vertical spacing between the bottoms of said upper and lower feeder member pockets is within the range of 10 to 30 cm.

7. The apparatus according to claim 1 wherein the vertical spacing between the bottoms of said upper and lower feeder member pockets is within the range of 15 to 20 cm.

8. The apparatus according to claim 1 including means for continuously delivering to the first rotary feeder member in said series materials to be preheated.

9. The apparatus according to claim 1 wherein said rotary feeder members are coupled to said materials delivery means to transfer materials between successive feeder members at a rate corresponding to the materials delivery rate of said materials delivery means.

10. The apparatus according to claim 1 wherein said rotary feeder members and materials delivery means are coupled to transfer materials between successive feeder members at a rate corresponding to a feeder member pocket filling of 20 to 30% capacity.

11. An apparatus for preheating solid material in divided form which comprises:
   a hollow flue having an inlet disposed at the upper part of the flue for receiving divided materials to be preheated, and an outlet disposed at the lower part of the flue for discharging preheated materials;
   a plurality of feeder members disposed within said flue for rotation relative thereto, said feeder members each having a plurality of recessed pockets for holding quantities of materials received and transferred therein and are arranged in a close-spaced consecutively descending relation to one another for transferring materials from the pockets of each feeder member to the pockets of an adjacent lower feeder member without extended free fall through said flue during rotation of said feeder member;
   a plurality of drive shafts, to which are fixedly attached said feeder members, rotatably extending through the wall of said flue for connection to an external drive means to rotate said feeder members, said drive shafts arranged in a plurality of rows extending across the width of said flue, substantially parallel and horizontal, said feeder members in each row being inclined at an angle with respect to the horizontal to define a zig-zag array of feeder members; and
   a rotary kiln disposed for communication with the materials discharge outlet of said flue to receive preheated materials therefrom and to deliver to said flue hot gases for preheating materials passing through said flue.

12. Apparatus as claimed in claim 11, wherein the driving shafts are hollow and are provided at one end with a coolant inlet and at the other end with a coolant outlet.

References Cited

UNITED STATES PATENTS

| | | | |
|---|---|---|---|
| 849,465 | 4/1907 | Dings | 263—31 |
| 1,018,951 | 2/1912 | Adlof | 263—31 X |

FOREIGN PATENTS 1,155,708   10/1963   Germany.

J. SPENCER OVERHOLSER, Primary Examiner

J. S. BROWN, Assistant Examiner

U.S. Cl. X.R.

263—32